United States Patent
Dulberg et al.

(10) Patent No.: US 12,246,283 B2
(45) Date of Patent: Mar. 11, 2025

(54) ATMOSPHERIC WATER GENERATOR WITH WATER COOLING SYSTEM

(71) Applicant: WATERGEN LTD., Petah Tiqwa (IL)

(72) Inventors: Sharon Dulberg, Beer Sheva (IL); Chen Nechemia, Rehovot (IL)

(73) Assignee: WATERGEN LTD., Petah Tiqwa (IL)

( * ) Notice: Subject to any disclaimer, the term of this patent is extended or adjusted under 35 U.S.C. 154(b) by 576 days.

(21) Appl. No.: 17/421,469

(22) PCT Filed: Jan. 8, 2020

(86) PCT No.: PCT/IL2020/050027
§ 371 (c)(1),
(2) Date: Jul. 8, 2021

(87) PCT Pub. No.: WO2020/144682
PCT Pub. Date: Jul. 16, 2020

(65) Prior Publication Data
US 2022/0064914 A1     Mar. 3, 2022

Related U.S. Application Data

(60) Provisional application No. 62/789,648, filed on Jan. 8, 2019.

(51) Int. Cl.
*B01D 53/26*       (2006.01)
*B01D 5/00*        (2006.01)
(Continued)

(52) U.S. Cl.
CPC .......... *B01D 53/265* (2013.01); *B01D 5/006* (2013.01); *B01D 5/0072* (2013.01);
(Continued)

(58) Field of Classification Search
CPC .... B01D 5/006; B01D 53/265; B01D 5/0072; B01D 5/0075; C02F 1/001; C02F 1/325;
(Continued)

(56) References Cited

U.S. PATENT DOCUMENTS 3,035,418 A    5/1962  Wright
3,050,954 A *  8/1962  Royse ............... F25B 39/02
                                                  62/93

(Continued)

FOREIGN PATENT DOCUMENTS

CN     2636123 Y     8/2004
CN     202850099 U   4/2013
(Continued)

OTHER PUBLICATIONS

Chinese Office Action in corresponding Chinese Application No. 2020800084871, mailed Jul. 21, 2022.
(Continued)

*Primary Examiner* — Cassey D Bauer
(74) *Attorney, Agent, or Firm* — PEARL COHEN LATZER BARATZ LLP

(57) ABSTRACT

An atmospheric water generator (AWG) with a water cooling system is disclosed. In some embodiments, the AWG includes a cooling compartment defined by walls, designed to comprise a cooling medium and comprising a refrigerant coil. The storage tank for storing the water that are generated by the AWG shares at least a portion of a common wall with the cooling compartment. The refrigerant coil of the cooling compartment is in fluid communication with the refrigeration cycle and designed to be at least partially submerged in the cooling medium. In some embodiments, the stored water tank is submerged in the cooling compartment. Other embodiments are also disclosed.

11 Claims, 9 Drawing Sheets

(51) Int. Cl.
    *C02F 1/00* (2023.01)
    *C02F 1/32* (2023.01)
    *E03B 3/28* (2006.01)
    *F25B 41/20* (2021.01)
    *F25B 47/02* (2006.01)
    *F25D 21/12* (2006.01)

(52) U.S. Cl.
    CPC ............ *B01D 5/0075* (2013.01); *C02F 1/001* (2013.01); *C02F 1/325* (2013.01); *E03B 3/28* (2013.01); *F25B 41/20* (2021.01); *F25B 47/022* (2013.01); *F25D 21/12* (2013.01); *C02F 2201/005* (2013.01); *C02F 2301/046* (2013.01)

(58) Field of Classification Search
    CPC .......... C02F 2201/005; C02F 2301/046; E03B 3/28; F25B 47/022; F25B 41/20; F25D 21/12
    See application file for complete search history.

(56) References Cited

U.S. PATENT DOCUMENTS

| | | |
|---|---|---|
| 4,255,937 A | 3/1981 | Ehrlich |
| 5,070,707 A | 12/1991 | Ni |
| 5,259,203 A | 11/1993 | Engel |
| 5,301,516 A | 4/1994 | Poindexter |
| 5,553,459 A | 9/1996 | Harrison |
| 5,727,857 A * | 3/1998 | Smith .................. A47F 3/0404 312/351.3 |
| 5,845,504 A | 12/1998 | Lebleu |
| 6,588,225 B1 | 7/2003 | Hodgson et al. |
| 6,644,060 B1 | 11/2003 | Dagan |
| 2004/0244398 A1 | 12/2004 | Radermacher et al. |
| 2006/0005561 A1 | 1/2006 | Murphy et al. |
| 2010/0275779 A1 | 11/2010 | Melikyan |
| 2012/0048119 A1 | 3/2012 | Morgan et al. |
| 2013/0008196 A1 | 1/2013 | Poyet |
| 2014/0150488 A1 | 6/2014 | Black et al. |
| 2015/0033774 A1 | 2/2015 | Ferreira et al. |
| 2016/0245564 A1 | 8/2016 | Frank et al. |
| 2017/0307251 A1 | 10/2017 | Baruch |

FOREIGN PATENT DOCUMENTS

| | | |
|---|---|---|
| CN | 204933466 | 1/2016 |
| CN | 206168393 | 5/2017 |
| CN | 107076465 | 8/2017 |
| CN | 206771833 | 12/2017 |
| CN | 207247715 U | 4/2018 |
| EP | 1478891 | 10/2008 |
| JP | S51162352 | 12/1976 |
| JP | S56119507 | 9/1981 |
| JP | H06-272974 | 10/1994 |
| JP | H06331251 | 11/1994 |
| JP | H08144329 | 6/1996 |
| JP | H11351684 | 12/1999 |
| JP | 2011524250 | 9/2011 |
| JP | 2013527889 | 7/2013 |
| JP | 2014238159 | 12/2014 |
| JP | 2017154813 | 9/2017 |
| WO | WO 2008108740 | 9/2008 |
| WO | WO2010004253 | 1/2010 |
| WO | WO 2012/161457 A2 | 11/2012 |
| WO | WO 2015/131184 | 9/2015 |

OTHER PUBLICATIONS

European Search Report in corresponding European Application No. 20738603.8, mailed Nov. 29, 2022.
International Search Report of PCT Application No. PCT/IL2020/050027, mailed Apr. 5, 2020.
"Air Conditioning Operation Management Manual", Jinchuan Li et al., p. 676, Shanghai Jiaotong University Press, Nov. 30, 2003.
"Refrigeration System Dynamic During the Reverse Cycle Defrost of an Air-Source Heat Pump Chiller", published in Proceedings of the Sixth National Cryogenic and Refrigeration Engineering Conference, Yanzhong Li et al., pp. 270-272, Xian Jiaotong University Press, Apr. 30, 2000.
Search Report from CN Office Action dated Dec. 31, 2024.

* cited by examiner

ATMOSPHERIC WATER GENERATOR WITH WATER COOLING SYSTEM

CROSS-REFERENCE TO RELATED APPLICATIONS

This application is a National Phase Application of PCT International Application No. PCT/IL2020/050027, International Filing Date Jan. 8, 2020, claiming benefit of U.S. Provisional Patent Application No. 62/789,648, filed Jan. 8, 2019, which is hereby incorporated by reference.

TECHNICAL FIELD

The present invention relates to the field of atmospheric water generators. More particularly, the present invention relates to a system for cooling the stored water and a system for defrosting an evaporator in atmospheric water generators.

BACKGROUND OF THE INVENTION

Extraction of water from air by atmospheric water generators, is well known and typically involves enforcement of condensation conditions of gas containing liquid vapor by lowering its temperature below the dew point temperature, causing vapor to condensate and liquid is thereby separated from the carrying gas.

The condensate water should be stored in a storage tank in order to dispense it whenever needed. In many cases, the preservation of the stored water in the storage tank at low temperature has two big advantages: it reduces microbiology growth in the storing tank; dispensing water at low temperature is preferred in some cultures, Improving water taste in some cases.

Till to this invention, few common ways were used to cool the stored water in the storage tank:

The first is by submerging a cooling coil inside the stored water storage tank.

This construction required the coil to be made of a material that is suitable for drinking water. Moreover, according to some standards, the coil should be double walled in order to avoid penetration of refrigerant toward the stored water in case of leakage. Both requirements render the cooling coil expensive. In some cases, the water level in the stored water storage tank changes and the coil might not be submerged completely in the water. This reduces the heat transfer rate and might require expensive solutions as well.

Another approach is to surround the stored water storage tank with a cooling coil. For this construction, a long coil is used due to the low common surface area between the coil and the outer side of the tank. Moreover, the water level in the stored water storage tank might be low, evoking low heat transfer and the cooling capacity should be modified by using a dedicated compressor which is very expensive.

A third approach is using a small coil with a separate refrigeration cycle. In this solution, the small cooling capacity meets the heat transfer rate for cooling the water in the stored water storage tank even at low water level. This solution requires two compressors and sometimes two condensers, an additional fan and so on, and therefore expensive.

When the dew point of the environment lowers to a level that water condensation is more efficient to occur in sub-zero evaporator temperature, frost may form on the evaporator's fins.

If the evaporator is not defrosted occasionally, the frost will gutter and block the air passages between the evaporator's fins. Moreover, condensate water will not be collected toward the stored water tank. The defrost procedure can be done by closing the compressor, blowing ambient air through the evaporator and wait until the frost melts. This common to the art procedure is time-consuming, reduces the daily water-production rate and.

SUMMARY OF THE INVENTION

The aim of the invention is to provide solutions to the challenges and drawbacks of atmospheric water generators described above.

In a first aspect the invention provides an atmospheric water generator (AWG) comprising a refrigeration cycle for condensing water from the atmosphere into stored water, a storage tank defined by walls for storing the stored water, a cooling compartment defined by walls, designed to comprise a cooling medium and comprising a refrigerant coil. The storage tank and the cooling compartment sharing at least a portion of a common wall separating the storage tank from the cooling compartment having one surface of the wall facing the storage tank and the other surface of the wall facing the cooling compartment. The refrigerant coil being in fluid communication with the refrigeration cycle and designed to be at least partially submerged in the cooling medium.

In a second aspect the invention provides atmospheric water generator (AWG) comprising: a refrigeration cycle for condensing water from the atmosphere into stored water, a storage tank for storing the stored water, and a circulation loop comprising an outlet from the storage tank, an inlet to the storage tank and a tubing line for connecting the outlet to the inlet, a circulation pump for circulating the stored water in the circulation loop and a water-refrigerant heat exchanger, comprising a refrigerant being in fluid communication with the water generation refrigeration cycle, designed to exchange heat between the refrigeration cycle and the stored condensate water during the circulation. When the circulation pump is operating, stored water may circulated from the storage tank, through the outlet, the tubing, the water-refrigerant heat exchanger, the circulation pump and back to the storage tank through the inlet (or to the dispenser outlet instead)—the circulated stored water exchanges heat with the refrigerant, such that circulated stored water exiting the water-refrigerant heat exchanger is relatively colder than circulated stored water entering the water-refrigerant heat exchanger.

In third aspect of the present invention, an atmospheric water generator (AWG) comprising a refrigeration cycle for condensing water from the atmosphere into stored water comprising an evaporator comprising a water inlet designed to drip water over the evaporator, a water collection means for collecting water exiting the evaporator, a storage tank for storing the stored water comprising a stored water inlet and a stored water outlet. The stored water outlet of the storage tank and the water inlet of the evaporator are in fluid communication designed to bring stored water from the storage tank to the evaporator allowing it to flow and cool over the evaporator; the cooled water exiting the evaporator being collected in said water collection means.

In a fourth aspect the invention provides an AWG comprising a refrigeration cycle, the refrigeration cycle comprising a compressor, a condenser, an evaporator, an expansion means, an evaporator, a refrigeration line connecting the compressor to the condenser, the condenser to the expansion means, the expansion means to the evaporator and the evaporator to the compressor and a defrost valve. The defrost valve being connected, optionally with a refrigerant line, to the refrigerant line connecting the compressor to the condenser and to one of (i) the refrigerant line connecting the expansion means to the evaporator or (ii) the refrigerant line connecting the evaporator to the compressor. The defrost valve enables, when activated, compressed refrigerant gas to flow from the condenser to the evaporator, by passing the expansion valve. In that case, hot gas flows toward the evaporator, heating it and enables the frost built on its fins to melt.

In a further aspect the invention provides a n AWG comprising a refrigeration cycle, the refrigeration cycle comprising a compressor, a condenser, an evaporator, an expansion means, an evaporator, a refrigeration line connecting the compressor to the condenser, the condenser to the expansion means, the expansion means to the evaporator and the evaporator to the compressor and a reversing valve installed on first refrigerant line connecting the compressor to the condenser and on the second refrigerant line connecting the compressor to the evaporator. When the compressor is activated and the reversing valve is in a first state, the valve allows compressed hot gas exit the compressor toward the condenser, and cold, low-pressure refrigerant to return the compressor from the evaporator; when the compressor is activated and the reversing valve is in its second state, the reversing valve reverses the flow direction and allows compressed hot gas to exit the compressor toward the evaporator, and cold, low pressure refrigerant to return the compressor from the condenser.

In a further aspect the invention provides methods for operating the systems described above.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
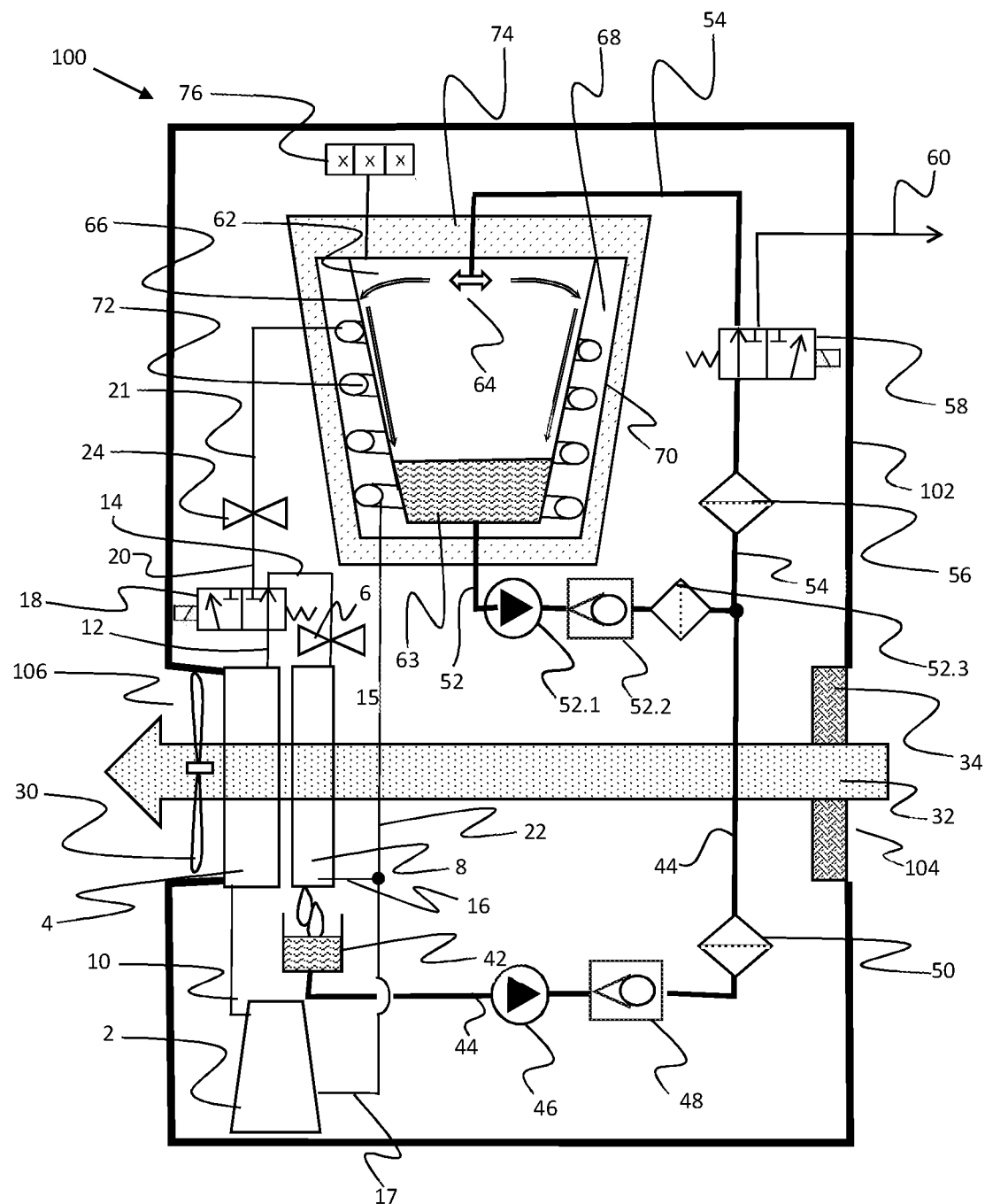
FIG. 1 is a block diagram of an atmospheric water generator (AWG) comprising a cooling system according to an embedment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention generally relates to improvements made in atmospheric water generators. The term "atmospheric water generator" (hereinafter "AWG") refers herein to any device which is capable of extracting water vapors (humidity) in the air, transform it into stored water by condensing some of the humidity into water. The condensation water is achieved by reducing the temperature of a relatively humid air flow down below its dew point. The atmospheric water generator thus comprises a refrigeration cycle as commonly used in the art including a refrigerant line, an expansion device (such as an expansion valve), an evaporator (cold heat exchanger), a condenser (hot heat exchanger), and a compressor. Usually the atmospheric water generator includes a blower to increase the volumetric airflow passing through the evaporator. Often, a collection means such as a water sump collects the water drops which are formed on the evaporator. The collected water is transferred in most cases from the water sump to a water tank for storing the condensed water either with the aid of a pump or gravitationally. Various filters may also be installed—for filtering the water (sedimentation filters, carbon filters, reverse osmosis filters etc.), adding minerals, sanitizing (e.g. with UV radiation), and for filtering the incoming air for purifying polluted air from particles and harmful chemicals. The AWG also includes dispensing means for providing the stored water upon demand, which include a dispensing line and at least one faucet and may also include an HMI unit showing water level, operational buttons and fault indications.

In a first aspect the invention relates to energy efficient cooling features for cooling stored water to meet demand for cold water by the user. The invention provides three optional features which can be implemented solely or in any combination: (i) a cooling compartment having a shared wall with the storage tank and comprising a cooling coil being submerged in a cooling medium. The stored water can optionally be connected to a stored-water circulation cycle which draws water from the storage tank and re-enters the tank, for example with a sprinkler for sprinkling the cycled water on the cooled walls of the storage tank; (ii) a stored-water circulation cycle which draws water from the storage tank and passes through a water-refrigerant heat exchanger where the water is chilled before reentering the stored water storage; (iii) a system which draws stored water from the storage tank and drips the stored water on the evaporator of the water generation refrigeration cycle, recollects and returns the chilled drops back to the storage tank. In some embodiments the refrigerant which is used to transfer heat with the stored water (or with the cooling medium in feature (i)) arrives from the main refrigeration cycle which is used for generating water from the air moisture.

Cooling Compartment System

The first feature provided by the invention for cooling generated stored water refers to an AWG having storage tank for storing the condensate water which is produced by the apparatus, and a cooling compartment (a vessel, a space, tank or container having a volume defined by walls which is capable of holding a liquid or gel cooling medium, hereinafter the "cooling compartment"), wherein at least a portion of at least one wall is common to the storage tank and to the cooling compartment and separates the two, such that one surface of the (partial) wall faces the storage tank and the opposite surface faces the cooling compartment (hereinafter the "common wall"). In other words, the storage tank and the cooling compartment are sharing at least a portion of a wall (the common wall). The term wall refers to any surface that forms a boundary between one space and another. The surface can be flexible such as thermoplastic polymer sheet, or non-flexible such as a stainless steel surface. The wall can be multilayered or coated.

The cooling compartment is designed to hold a cooling medium, and comprises a refrigerant coil being in fluid communication with the refrigeration cycle. The cooling medium can be a liquid or a gel which can act as a thermal buffer by maintaining a low temperature for a prolonged duration. In some embodiments the cooling medium is made from a material having a melting point temperature lower than 0° C. In some embodiments the cooling medium is a mixture of water and propylene glycol.

When the cooling compartment is filled with a cooling medium, the cooling medium comes in contact with the common partial wall from the compartment face and heat can be transferred form the stored water located on the other wall surface, facing the storage tank through the common wall toward the cooling medium. In some embodiments all the outer lateral sidewalls and bottom end of the storage tank are surrounded by the cooling medium. The term sidewall should be construed to include the two opposing sides of a vessel as well as the opposing front and back when the vessel has cubic walls. In some embodiments more than 30%, 40%, 50%, 60%, 70%, 80% or 90% of the sidewalls of the storage tank are common with the cooling compartment and may exchange heat with the cooling medium. In some embodiments the storage tank is jacketed by the cooling compartment, i.e., it is intimately covered by the cooling compartment.

In some embodiments the cooling compartment is enclaved in the storage tank. In some embodiments the cooling compartment forms a protrusion inside the storage tank. In some embodiments the cooling compartment forms multiple protrusions into the storage tank. In some embodiments, the compartment is partially surrounded by the water storage tank. In some embodiments, all the outer lateral sidewalls and bottom end of the compartment are surrounded by the storage tank. In some embodiments more than 30%, 40%, 50%, 60%, 70%, 80% or 90% of the sidewalls of the compartment are surrounded by the storage tank.

In some embodiments, the common wall is made of a smooth surface, and in some embodiments it is made of waved surface to increase surface area and improve the heat transfer between the cooling medium and the stored water stored in the storage tank.

In some embodiments even portions of the top end of the storage tank are surrounded by the cooling medium. The option of having the top end of the storage tank submerged in the cooling medium is less favorable due to concern of possible leakage of the cooling medium into the stored water.

In some embodiments the storage tank is made of a thermoplastic material. In some embodiments the storage tank is made of a metallic material such as stainless steel. In some embodiments only the common wall to the storage tank and the cooling compartment is made of a metallic material such as stainless steel.

In some embodiments at least one of the storage tank and the cooling compartment comprises at least a second portion of a wall, other than the portion of a wall that is common to both the storage tank and to the compartment, wherein the second at least portion of the wall is covered by insulation layer.

In some embodiments, the structure of the cooling compartment is sealed so leakage from the cooling compartment toward the tank is prevented. In some embodiments the structure of the tank is sealed so water cannot flow or drip into the cooling compartment.

The cooling coil is accommodated in the cooling compartment in such a manner that when the cooling compartment holds the cooling medium, then the cooling coil is at least partially submerged in the cooling medium and transfers heat from the cooling medium to the main refrigeration cycle of the AWG. In some embodiments, the cooling coil is in close contact or attached to the sidewall of the storage tank, so it concomitantly chills the cooling medium and the storage tank and indirectly chills its content.

There are several advantages of this solution over the conventional solutions of submerging a cooling coil in the stored water directly. The first is that the cooling medium functions as a heat sink capacitor even when the level of stored water in the tank is low. When new water is introduced to the storage tank, the newly added water is chilled by transferring heat to the previously chilled cooling medium. The second is that the cooling coil can be coupled to the main refrigerating cycle of the water generation refrigeration cycle and by using the same refrigeration cycle components, to chill the water stored in the water tank. This comes instead of either having a designated refrigerating loop, needing to operate the main refrigerating loop especially for cooling the stored water or installing a TEC heat exchanger for chilling water ad-hoc. Another advantage is that the refrigerant coil does not need to come in direct contact with the stored water, which requires the use of a double walled coil and/or made of a food grade material.

The cooling medium can be cooled at least to a temperature close or below water freezing point. In some embodiments the cooling medium can be selected from water, ethylene glycol, propylene glycol or combination thereof.

The storage tank can be any form of water tank available in the art for storing water. The volume of the storage tank is adapted according to the specific application of the AWG. Generally, it should have a volume which would be sufficient to provide supply of water for meeting the highest reasonable demand in short period of time which exceeds the production rate of fresh water by the apparatus. For example, an AWG which is meant to be used as a domestic water dispenser would usually include a storage tank having the volume of about 10 Liters.

In some embodiments only a portion of the stored water is intended for dispensing chilled water. In these embodiments the AWG may comprise a separate tank for cold water (hereinafter a "cold water tank"), and the cooling system cools the cold water tank instead of the main stored water storage tank.

The volume of the cooling compartment needs to be proportional to the volume of the coil required cooling capacity. In order to improve the heat transfer rate from the cooling coil to the medium, the compartment design is better to allow a thermosiphon effect, so that the medium will circulate during the cooling process. The volume of the medium and common wall surface should be designed to meet the required cooling periods. The person of skill in the art would know to calculate the required volumes, surface areas, flowrates, etc. in order to reduce the initial temperature of the generated water to the desired target temperature and required cooling rate.

In some embodiment, insulation is used to insulate the walls of the storage tank that are exposed to the ambient or hot air and/or insulating the walls of the cooling compartment that are exposed to the ambient or hot air and reduces heating of the cooling medium as well as the stored water in the tank and by that it saves energy.

In some embodiments the storage tank is capped with a cap adapted to reduce leakages of stored water from the storage tank. In some embodiments the cooling compartment is capped with a cap adapted to reduce leakages of cooling medium from the cooling compartment. In some embodiments both vessels are capped with a single cap.

To operate the cooling and the hydraulic system, the system may further comprise a control unit being connected to at least one of:

A temperature sensor (e.g. a thermometer or thermocouple) adapted to measure the stored water temperature.

A temperature sensor adapted to measure the cooling medium temperature.

A temperature sensor adapted to measure the evaporator temperature.

A volume of float sensor adapted to measure the amount of water in the tank.

A volume of float sensor adapted to measure the amount of water in the sump.

A control unit may also connect those sensors, and/or operate some of the refrigeration cycle components and some of the hydraulic components such as compressor, refrigerant valves, pump(s), hydraulic valves, UV lamp, etc.

In some embodiments, the control unit may be connected to a user interface to accept dispensing command (pouring button) or in order to display water level.

The control unit is programed to perform the logic of the system, for example according to the logic described by algorithms 500, 700, 710 & 720 or 600, 700, 710 & 720. In some embodiments, the control unit is programed to perform the logic described also in algorithm 800.

Heat Exchanger Chiller System

Another stored water cooling feature the invention provides is an AWG comprising a stored water circulation loop that circulates the water from a storage tank through a heat exchanger for cooling the stored water, wherein the heat exchanger is in fluid communication with the refrigeration cycle for generating water of the AWG.

To this end, the AWG comprises a refrigeration cycle for condensing water from the atmosphere into stored water, a storage tank for storing the stored water, and a stored water circulation loop. In some embodiments, the AWG comprises a separate cold water storage tank, and in these embodiments the circulation cycle is connected to the cold water tank and the water stored in the cold water tank is circulated and cooled by the cooling system. The refrigeration cycle for generating water by condensing water from the atmosphere into stored water comprises a refrigerant line, an expansion device (such as an expansion valve), an evaporator, a condenser, and a compressor. The water that is generated can be first stored in a sump and then transferred to a storage tank of stored water or may directly be collected into the storage tank.

The storage tank is connected to a circulation loop comprising an outlet from the storage tank, an inlet thereto and a tubing line for connecting the outlet to the inlet. The circulation loop further comprises a main pump for circulating the stored water in the circulation loop, and a heat exchanger designed to exchange heat between the refrigeration cycle and the stored condensate water during the circulation.

The setup order of the pump and the water-refrigerant heat exchanger has almost no significance, i.e. the water pump can be upstream the water-refrigerant heat exchanger or vice versa.

The circulation loop may further comprise unidirectional valves, for example, a unidirectional valve placed upstream the circulation pump to prevent backflow of water to the circulation pump, various water filters, a three-way valve for directing water to other lines such as a dispensing line.

In some embodiments the circulation loop can be joined with a collection line which leads water from a collection sump to the storage tank via a bi-directional inlet valve.

In some embodiments, a bi-directional valve diverts refrigerant flow exiting the condenser toward the water-refrigerant heat exchanger. In some embodiments, water-refrigerant heat exchanger is connected in series to the evaporator, so a bi-directional valve is not required. Expansion means should be located between the refrigerant line connecting the condenser exit and the water-refrigerant heat exchanger.

The water-refrigerant heat exchanger has an entry allowing stored water circulating in the stored water circulation loop to enter the heat exchanger, exchange heat with a refrigerant and exit the heat exchanger back to the stored water. Conventional plates heat exchangers or tubular heat exchanger or any other appropriate heat exchanger can be used for this purpose. The person of skill in the art would know to calculate the required surface areas, volumes, flow rates, and so on. in order to reduce the initial temperature of the generated water to the desired target temperature in the required rate.

Dual Function Evaporator System

A third feature for cooling stored water in an AWG apparatus relates to a system which draws water from the storage tank and brings the drawn water into contact with the evaporator of the water generation refrigeration cycle. The stored water transfers heat with the refrigerant in the evaporator and water exiting the evaporator at a lower temperature is collected by the generated water sump (or any other collection means such as a funnel connected to a water line) and returned back to the storage tank. Thus, stored water arriving from the storage tank is cooled over the evaporator and exits the evaporator at a lower temperature.

The system includes a stored water outlet which is connected to a water line that brings stored water to the evaporator of the water generation refrigeration cycle. The passage of water from the storage tank to the evaporator can be gravitational, if the water tank is positioned above the evaporator. In some embodiments the water line may comprise a water pump to pull stored water from the tank. In some embodiments, the water line can comprise an on-off valve. In some embodiments the on-off valve is operated by a control unit which is connected to a thermometer located in the storage tank and receives temperature reading therefrom, and activates the on-off valve (or the said pump)

whenever the temperature is equal or above a predetermined threshold set by the manufacturer or as set by the user and whenever the water temperature reaches a low predefine value, the cooling is ceased. In some embodiment, the on-off valve is operated by a thermostat.

In some embodiments, the water line may either pass next to the evaporator where it drips the water thereon. In some embodiments, the water line comprises holes or slits which drip water droplets along the cooled fin and from there they drip to a water sump, as the condensed droplets derived from the humid air. In some embodiments, during the water cooling process, a fresh air shutter window in the enclosure of the AWG that is located passed the evaporator, in some embodiments between the evaporator and the condenser, is opened, reducing the airflow upon the evaporator and allowing the condenser to be cooled by the fresh air from the environment surrounding the AWG. This system allows cooling the water without condensing water and is useful especially when the tank is full and adding new condensate water will cause it to overflow. It further reduces the risk that dripped water over the evaporator will swipe away because of the airflow that flows over the evaporator. Under hot and humid conditions, very little air is required for the generation of water by the evaporator, but on the other hand, the condenser heats more than usual and requires more air to chill. The fresh air window that is located between the evaporator and the condenser can solve this problem by such that it is (fully or partially) opened to allow a second air stream inflow to join the airflow that flows through the condenser which cool down the temperature of the condenser without increasing the amount of air passing through the evaporator, and in some cases, even decreasing it.

Reference is now made to FIG. 1 depicting an AWG apparatus 100 according to an embodiment of the invention. The apparatus should comprise many components that are not shown inn FIG. 1 or the figures to come such as a utility line, controller, temperature sensor(s), push button(s) and some other control means. A person skill in the art would know how to extrapolate the details provided herein into a fully operative AWG. The apparatus 100 comprises an enclosure 102 having an air inlet 104 (equipped with an air filter 34) and air outlet 106. The enclosure 102 accommodates a water generating refrigeration cycle, a water chilling refrigeration cycle and a generated water system. The water generating refrigeration cycle comprises a compressor 2, condenser 4, expansion means 6, evaporator 8, and a set of refrigerant tubes 10, 12, 14, 15, 16 and 17. A refrigerant gas is compressed in the compressor 4. The compressed refrigerant gas travels in refrigerant line 10 to the condenser 4 where it condenses into a liquid. The condensed liquid travels out of condenser 4 through refrigerant line 12. A bi-directional valve 18 is installed on the refrigerant tube 12 and has two states. In a first state, it directs the condensed refrigerant liquid to refrigerant tube 14 where it flows in the water generation refrigerant cycle and reaches the evaporator 8 for condensation of humidity into water. In a second state, the bi-directional valve 18 directs the condensed refrigerant liquid to refrigerant line 20 of a water chilling refrigeration cycle to be described infra. After the condensed liquid is transferred to refrigerant tube 14, it reaches an expansion means 6 (e.g. capillary tube, expansion valve), where it turns into a liquid-gas cold mixture and enters the evaporator 8 in where it evaporates. After exiting the evaporator 8, the refrigerant in gas phase is transferred through a suction lines 16,17 back to the compressor 2 to complete the cycle.

A blower 30 is located near the air outlet 106 and motivates (when active) an air flow 32 to enter the enclosure through the air inlet 104. The air then passes through an air filter 34, which removes particles and may absorb chemical contaminants, then through the evaporator 8, where the temperature of the airflow is reduced below its dew point, shelling off some moisture which condenses into water droplets. The relatively cooled and dry airflow further flows through the condenser 4, in which it is being heated and then flows out of the enclosure 102 through the air outlet 106. In some embodiments, the blower 4 can be located in any suitable position along flow-line 32.

The water droplets that are generated by the evaporator 8 are collected gravitationally in a water sump 42. The latter is part of the hydraulic water system, which will now be detailed. The water in sump 42 is pumped by a collection pump 46 which is located on a water collection line 44 in order to direct the water to a storage tank 62 for storing the stored water 63. A unidirectional valve 48 located upstream the collection pump 46 directs the water stream with no return to a collection filter 50. The collection filter may be a sediment filter, to reduce sediments such as fine duct, an active carbon filter to absorb chemicals, a combination of the two or any other suitable filtration media. From the collection filter 50, the water line 44 joins a hydraulic main suction line 52 into a sprinkle line 54. The hydraulic main suction line 52 is equipped with the main pump 52.1, followed by a unidirectional valve 52.2 and second filter 52.3, for example, an active carbon filter or Calcite filter. Upstream the junction of lines 44 and 52 is a second filter 56 positioned on sprinkle line 54. The third filter 56 treats both the water arriving from the collection line 44 and the water arriving from the hydraulic main suction line 52. Filter 52 can be, for example a UV filter or nanometric filter. Upstream the second filter 56 is a bidirectional hydraulic valve 58. In a first state (default), the valve directs the water to remain on the sprinkler line 54 and in a second state it diverges the water from the sprinkler line 54 to a dispensing line and outlet 60. The bidirectional hydraulic valve 58 is in communication with a control button (not shown) which is available to the user and can be placed for example on the control panel interface of the apparatus, or it can be for example a mechanical push button close to the faucet of the apparatus. The dispensing of water can continue for a preset duration (for example a duration sufficient for filling a standard glass of water or a carafe) or as long as the user presses the control button, as commonly known in the art.

Upstream the bidirectional water valve, the sprinkler line 54 enters the top end of the storage tank 62 and ends with a sprinkler 64. The sprinkler 64 receives the circulation water and sprinkles it on the inner side 66 of the common wall of the storage tank 62 and a cooling compartment 70. As a result, the sprinkled water exchanges heat with the sidewall of the storage tank 62 which in turn exchanges heat with a cooling medium 68 (e.g. liquid or gel) which is contained in a cooling compartment 70. The cooling compartment 70 jackets the storage tank 62 around all of its sides including the bottom and excluding the top end.

In some embodiments, at least one of the unidirectional valve 48,52.2 are included inside the pump (46,52.1 accordingly). In some embodiments, the evaporator 8 bottom is located above the storage tank 62 and the water can flow directly from the evaporator toward storage tank. This eliminates the need for pump 46, unidirectional valve 48 and even sump 42. In some embodiments, there may be another intermediate (ambient temperature) tank on line 54. In some embodiments, at least one of the sprinkler, one of the filters, one of the unidirectional valves might not be required.

Back to the refrigeration cycle, a cooling coil 72 for cooling the refrigerant medium 68 is submerged in the refrigerant medium 68. The cooling coil 72 is connected downstream to a refrigerant line 21, which extends out of the water generation refrigeration cycle, from the bidirectional valve 18. When valve 18 directs the refrigerant toward the cooling coil, the refrigerant in liquid state flows through line 20 toward second expansion mean 24. In some embodiments, the expansion means 6, 24 can be united to one expansion mean located right before bi-directional valve 18. The refrigerant become a liquid-gas cold mixture, and flows throw line 21 toward chilling coil 72. Inside coil 72, the refrigerant boils at low temperature, absorb heat energy from cooling media 68. From coil 72 the refrigerant flows toward refrigerant line 22 which connects to the refrigerant suction line 16 exiting the evaporator 8, and returns to the compressor 2 through suction line 17 to conclude a closed cycle.

The cooling coil 72 has a helical form or rectangular-helical form in order to increase the surface area ratio and thus increase heat transfer efficiency with the refrigerating medium 68, and it is positioned, in the given exemplary embodiment, in proximity to the common wall 66 of the storage tank 62 and the cooling compartment 70 in order to more efficiently chill the content storage tank 62 by direct chilling of the common wall 66 in addition to the cooling of the refrigerating medium 68.

The cooling compartment 70 is insulated with an insulation layer 74 covering the outer wall of the cooling compartment 70. The insulation layer can be made of insulating foam such as foamed polyurethane, mineral wool or other suitable material.

A breather 76 is attached to the storage tank, allowing equalizing the air pressure of tank 62 with the surrounding, to filter the air entering the tank during the dispensing process and to evacuate air from the tank during its filling process.

Figure 2:
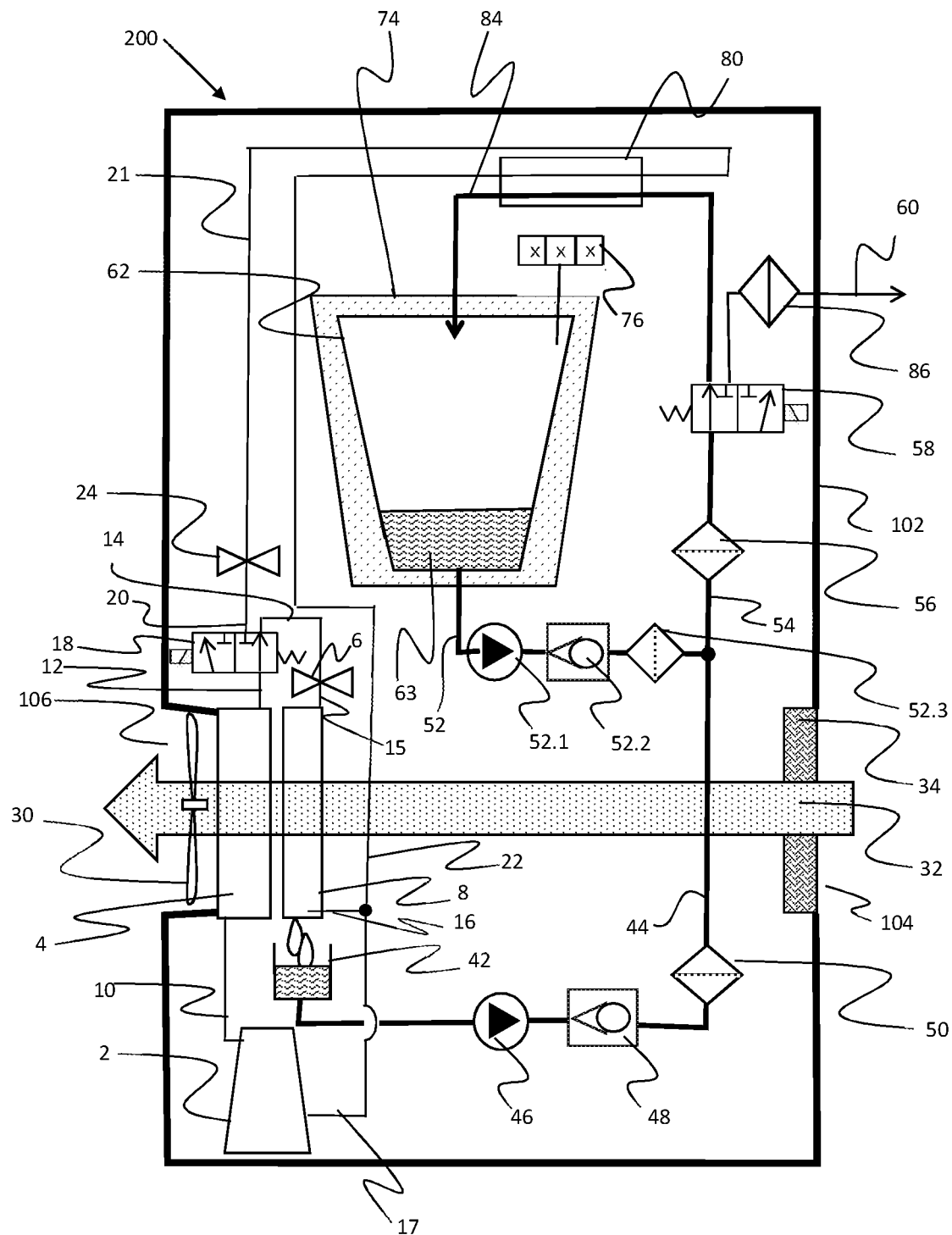
FIG. 2 is a block diagram of an AWG comprising another cooling system according to an embedment of the invention.

Reference is now made to FIG. 2 depicting another water-cooling feature of an AWG apparatus according to an embodiment of the invention. The AWG apparatus 200 shares most components having an identical arrangement as the AWG apparatus 100 depicted in FIG. 1. Similar components are identically annotated and only the differences between the two embodiments are discussed hereby.

The water-cooling refrigerant cycle of the AWG 200 comprises a water-refrigerant heat exchanger 80 located on the refrigerant line 21. Thus, instead of cooling a cooling medium in a cooling compartment 70 as in apparatus 100, the refrigerant of the water-cooling refrigerant cycle exchanges heat with (usually stored) stored water that is circulated in the circulation line through the water-refrigerant heat exchanger 80.

In its default state, bidirectional valve 58 direct the combined circulation and collection line towards a water-refrigeration heat exchanger 80 located hydraulically upstream the three-way valve 58. The refrigerant passes through the water-refrigerant heat exchanger 80 and exchanges heat with the circulating water that passes through the water-refrigerant heat exchanger 80. As a result, water, which exit the water-refrigerant heat exchange through line 84 is cooler than the water entering the water-refrigerant heat exchanger.

When valve 18 directs the refrigerant toward heat exchanger 80, the refrigerant in liquid state flows through second expansion mean 24. The refrigerant becomes a liquid-gas cold mixture, and flows throw line 21 toward heat exchanger 80. Inside heat exchanger 80, the refrigerant boils at low temperature, absorb heat energy from water flowing toward line 84. From heat exchanger 80, the refrigerant flows toward refrigerant line 22 which connects to the refrigerant line 16 exiting the evaporator 8, and returns to the compressor through suction line 16 to conclude a close cycle.

The AWG apparatus 200 further comprises a dispensing filter 86 along line 60, for example a nanometric filter.

An insulation layer 74 insulates the storage tank.

Note that the AWG apparatus 200, lacks the cooling compartment 70 which characterizes the AWG apparatus of FIG. 1. Nonetheless, in some embodiments of the invention an AWG apparatus can comprise both means for cooling the stored water.

Figure 3:
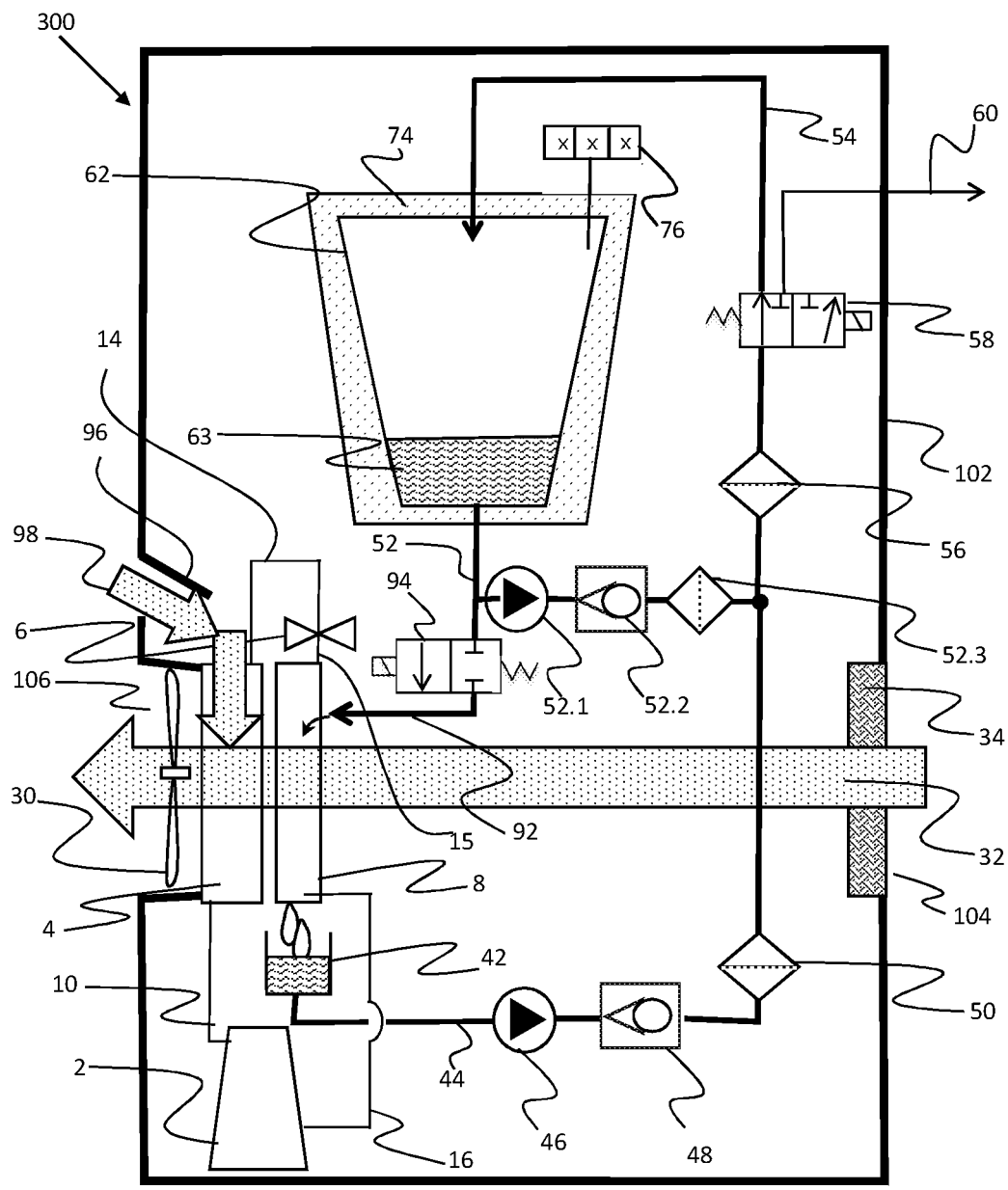
FIG. 3 is a block diagram of an AWG comprising another cooling system according to an embedment of the invention.

Reference is now made to FIG. 3 depicting an AWG apparatus comprising yet another feature for cooling the stored water in the storage according to the invention. The AWG apparatus 300 shares most components having an identical arrangement as the AWG apparatuses 100 and 200 depicted in FIGS. 1 and 2, respectively. Similar components are identically annotated and only the differences between the two embodiments are discussed herein below.

A water-cooling outlet 92 is connected to the outlet 52 of tank 62 through an on-off valve 94. In some embodiments, a bidirectional valve is positioned at the junction of outlet 52 and water cooling outlet 92 instead of the on-off valve 94. The end of the water cooling outlet 92 is located in proximity or embedded with the evaporator 8 of the water generation refrigeration cycle. When the on-off valve 94 is on, stored water from the hydraulic main suction line is gravitationally flowing to the evaporator 8 where exchanges heat with the water-generation refrigerant and pours into the water sump 42 and may mixed with freshly generated water that condensed from the moisture of the stream of air 32. The chilled water is then returned the storage tank 62 to as previously detailed for the generated water track from the water sump 42 to the storage tank 62.

This cooling mechanism, renders the refrigeration line extension to the cooling mechanisms that was required for the cooling compartment 70 or the cooling water heat exchanger 80 moot. Therefore, in apparatus 300 there is no need for a bidirectional valve such as valve 18 and refrigerant lines 21 and 22 that are used in apparatuses 100 and 200. Accordingly, the refrigerant line exiting the evaporator extends all the way to the compressor, as it does not join the refrigerant line 22, which exits the water-cooling refrigeration cycle.

In some embodiments, a shutter 96 in the enclosure 102 is being open to define an aperture in the enclosure during the water-cooling process. The aperture allows air 98 to enter the condenser 4 without passing through the evaporator 8, reducing airflow over the evaporator 8 and reducing the risk for the dripping water to be drifted away. It also allows accelerating the cooling process because most of the cooling capacity of the evaporator is directed to chill the water rather tank to condense more water from the air.

In some embodiment, especially when the storage tank is located below the evaporator, valve 94 may be replaced by a pump for that functionality.

Defrost Cycle

In another aspect, the invention provides a defrost cycle (i.e. a defrost system) for evaporators of AWG machines. When the dew point of the environment reduces to a level that water condensation is more efficient to occur in sub-zero evaporator temperature, frost may form on the evaporator's fins. In embodiments in which the evaporator is a fins and tubes heat exchanger, if the evaporator is not defrosted occasionally, the frost will gutter and block the air passages between the evaporator's fins. Moreover, condensate water will not be collected toward the stored water tank. The defrosting system detailed below significantly reduces the defrost duration of available methods in the art.

According to the invention, the refrigeration cycle, which comprises a compressor, a condenser, an evaporator, an expansion means, an evaporator, a refrigeration line connecting the compressor to the condenser, the condenser to the expansion means, the expansion means to the evaporator and the evaporator to the compressor, further comprises a defrosting system.

One option of a defrosting system comprises of an on-off valve being connected, optionally with a refrigerant line, to the refrigerant line connecting the compressor to the condenser and to one of (i) the refrigerant line connecting the expansion means to the evaporator or (ii) the refrigerant line connecting the evaporator to the compressor. When the on-off valve is in an active mode it enables compressed refrigerant gas to flow from the compressor to the evaporator, consequently warming the evaporator and melting the frost/ice.

Another option for a defrosting system comprises a reversing valve. The reversing valve is a four way reversing valve installed on the refrigerant line connecting the compressor to the condenser and on the refrigerant line connecting the compressor to the evaporator. The reversing valve can be actuated between two states. In a first state the reversing valve is not activated while the compressor is activated, the reversing valve allows compressed hot gas to exit the compressor toward the condenser, and cold, low-pressure refrigerant to return the compressor from the evaporator. When activated while the compressor is activated, the reversing valve reverses the flow direction and allows compressed hot gas exit the compressor toward the evaporator, and cold, low pressure refrigerant to return to the compressor from the condenser. This reverse flow actually reverses the role between the evaporator and the condenser, the evaporator now is the hot heat exchanger, and consequently, warming the evaporator and melting the frost/ice.

Figure 4A:
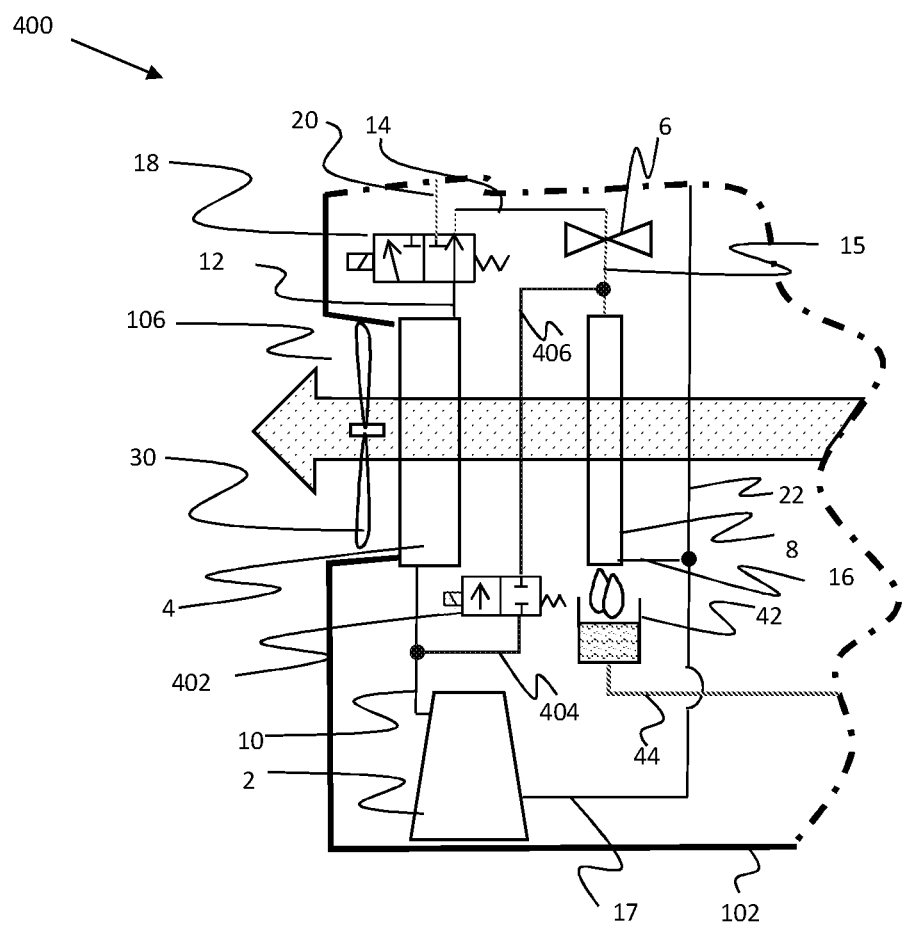
FIGS. 4A and 4B are block diagrams of an AWG each comprising different addition to the cooling system according to an embedment of the invention.
Figure 4B:
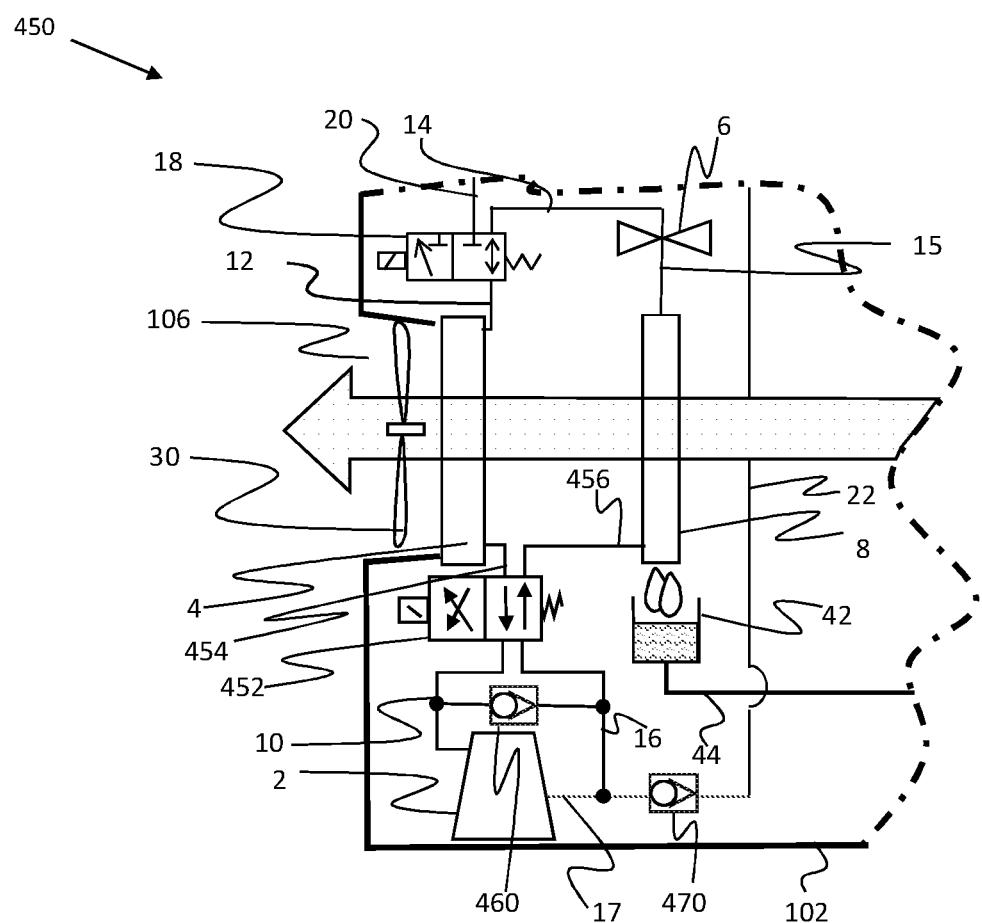

Reference is now made to FIGS. 4A and 4B depicting specific embodiments of defrost systems according to the current invention.

The AWG apparatus 400 shares most components having an identical arrangement as the AWG apparatuses 100, 200 and 300 depicted in FIGS. 1,2 and 3, respectively. Similar components are identically annotated.

FIG. 4A describes an additional on-off valve connected between refrigerant line 10 and line 15 being the defrosting valve. When activated, the on-off valve 404 is configured to allow flow of hot compressed gas from refrigerant line 10 through line 404, then through line 406 and then toward the evaporator entrance line 15.

The operation of the on-off valve 402 is controlled by the control means of the AWG (not shown in the figure).

When a defrost procedure starts, the compressor 2 shuts down and the valve opens to allow hot gas refrigerant in high pressure from the condenser 4 to flow toward the evaporator 8. The hot gas increases the temperature of the evaporator's components (e.g. the fins) and melts the frost into water. Further defrost can be done by blowing ambient air through the evaporator 8 and wait until the frost melts to a sufficient level or melts completely.

In some embodiments, the on-off valve 402 is connected between lines 10 and line 17 instead to line 15 in FIG. 4A performing almost the same function.

Reference is now made to FIG. 4B depicting an AWG apparatus comprising yet another feature for defrosting the frost build-up on the evaporator according to the invention. The AWG apparatus 450 shares most components having an identical arrangement as the AWG apparatuses 100, 200 and 300 depicted in FIGS. 1,2 and 3, respectively. Similar components are identically.

FIG. 4B describes another embodiment of a reversing valve 452 connected between refrigerant lines 10, 16, 454 and 456.

When reversing valve 452 is not activated, the refrigerant can flow as described in apparatus 100, 200 and 300. Line 454 allowing the refrigerant to flow from line 10 toward the condenser 4 and line 456 allowing the refrigerant to flow from the evaporator toward line 16.

When reversing valve is activated, the refrigerant from the condenser 4 is diverted through line 454 toward line 16 and from line 16 toward the compressor suction line 17. Moreover, the compressed hot refrigerant gas exits the compressor and after flowing in line 10 is diverted toward the evaporator 8 through line 456. This reversing action actually reverses the roles of the evaporator and the condenser. For sake of simplicity of the explanation, the names of elements 4 and 8 will remain "condenser" and "evaporator" accordingly, even after the reversing valve 452 is activated and the evaporator 8 is acting as a condenser and vice versa. The refrigerant also flows in the opposite direction in the rest of the refrigeration system in lines 12, 14 and 15 and in elements 6 and 18. The evaporator 8 heats, and the condenser 4 cools, which allows the frost on the evaporator 8 to melt rapidly from its fins. When the defrost procedure completes, the control unit can de-operate the reversing valve 452 and the roles of the evaporator and the condenser return as they were before the operation.

FIG. 4B further contains unidirectional valve 460. When the pressure in line 16 is greater than the pressure in line 10, the unidirectional valve 460 opens, and allows refrigerant to flow through itself from line 16 to line 10 and to equalize the pressure. On the contrary, when the pressure in line 10 is greater than the pressure in line 16, the unidirectional valve closes, blocks the refrigerant to flow through itself and thus not allowing equalizing the pressure. In summary, the unidirectional valve 460 keeps the suction pressure of compressor 2 always lower than the discharge pressure of the compressor 2. For example, in the transient period, after reversing valve 452 turns to be activated, high condenser pressure can be discharge toward the evaporator 8, causing the refrigerant to flow parallel to the compressor 2 and thus increasing the refrigerant flow rate. After the transient period, when the compressor 2 discharge pressure is higher than the suction pressure, the unidirectional valve is automatically closed. The action of the unidirectional valve 460 repeats also in the transient period right after the reversing valve turns to be not activated.

Unidirectional valve 470 can be added to apparatus 100 or 200 containing a reversing valve as described. It keeps from high-pressure refrigerant in line 16 (especially in transient states of reversing valve) to flow toward line 22. If the pressure in line 22 is greater than the pressure in line 17, the unidirectional valve 470 opens and allows refrigerant to flow through itself and to equalize the pressure. On the contrary, when the pressure in line 17 is greater than the pressure in line 22, the unidirectional valve 470 closes, blocks the refrigerant to flow through itself and thus not allowing equalizing the pressure.

In some embodiments, just one of the unidirectional valves 460, 470 is used. In some embodiments, the locations and connection points of the reversing valve 452, and/or the unidirectional valves 460 and 470 are different from the described above but perform similar action.

Method for Operating an AWG Having a Water Cooling System and/or a Defrosting System In another aspect, the invention provides a method for operating the stored water cooling system and/or the defrosting system according to the invention.

FIGS. 5-8 describe the apparatus logic of operation. It will be appreciated that for simplicity and clarity of the logic explanation, steps and condition steps shown in the figures describe just the basic logic to operate the system. For example, other additional steps and conditioning steps may refer to user interface, shutting down the system if the environmental temperature is too low, etc.

The logic may be programed upon the controller unit, more than one controller unit can be implemented using electric board, in hydraulic means or any appropriate manner A person skilled in the art would now how to alter the described logic and to fulfil those additions and alternations, and will know how to fulfill the logic in the control unit or in equivalent hardware.

Further, where considered appropriate, reference numerals may be repeated among the figures to indicate corresponding or analogous elements.

The logic describes 5 modes of operation that in some embodiments (such as the one depicted in FIG. 5) only one of them can occur simultaneously:

Shut Down Mode
  a. In which the compressor is closed, the blower is off and neither water condensation nor water cooling occurs.

Water Cooling Mode
  a. In which the water condensation ceases (or continues to be idle if the water components of the AWG that condense water were not operating prior to switching to the water cooling mode), and the water in the tank is cooled down by operating water cooling system of the AWG. In apparatuses 100 and 200 for example, it means that compressor 2 is operated, blower 30 is operated, and bi-directional valve 18 diverts the refrigerant from line 12 toward line 20.
  b. In apparatus 300 for example, compressor 2 is operated, blower 30 is operated (if a shutter between the evaporator and the condenser exists, it opens as well) and on-off valve 94 allows water from the tank to spill over the evaporator through line 92. If defrost system 400 exists in the apparatus, valve 402 should remain closed. If defrost system 450 exists in the apparatus, valve 452 should remain in it default position (non-reversing).

Water Production Mode
In which the water-cooling ceases and water condensation process starts by operating the components of the AWG that are involved in condensation of water. In apparatuses 100 and 200 for example, it means that compressor is operated, blower is operated, and bi-directional valve 18 divert the refrigerant from line 12 toward line 14.
  a. In apparatus 300 for example, compressor is operated, blower is operated (if a shutter between the evaporator and the condenser exists, it closes) and on-off valve 94 does not allow water from the tank to spill over the evaporator.
  b. If defrost mechanism such as 400 exist in the apparatus, valve 402 should remain closed. If defrost mechanism such as 450 exist in the apparatus, valve 452 should remain in it default position (non-reversing).

Ice Production Mode
In which the water-cooling is idle and water condensation process occurs but unlike in the water-production mode, the condensed water freezes on the evaporator due to the evaporator's sub-zero temperature. The operation of elements are similar to the described in the WATER PRODUCTION mode above, but this time, ice building is monitored by at least one timer and/or by measuring the evaporator temperature.

Defrost MODE
  a. In which the ice production ceases and the frost on the evaporator is being melted by operating a defrost system. In apparatuses such as 100-300, not comprising mechanism 450, melting the ice can be done by stopping the compressor, closing shutter (if exist as in apparatus 300), and operating the blower in order to blow fresh air to melt the frost. If the apparatus comprises defrost mechanism such as 400, the valve 402 should be open at least in the beginning of the process.
  b. In apparatuses such as 100-300, comprising mechanism 450, it can be done by allowing the compressor to operate, preferably opening shutter (if exist in apparatus 300), operate the reversing valve 452 and operating the blower in order to heat the condenser (which actually functions as an evaporator)

Figure 5:
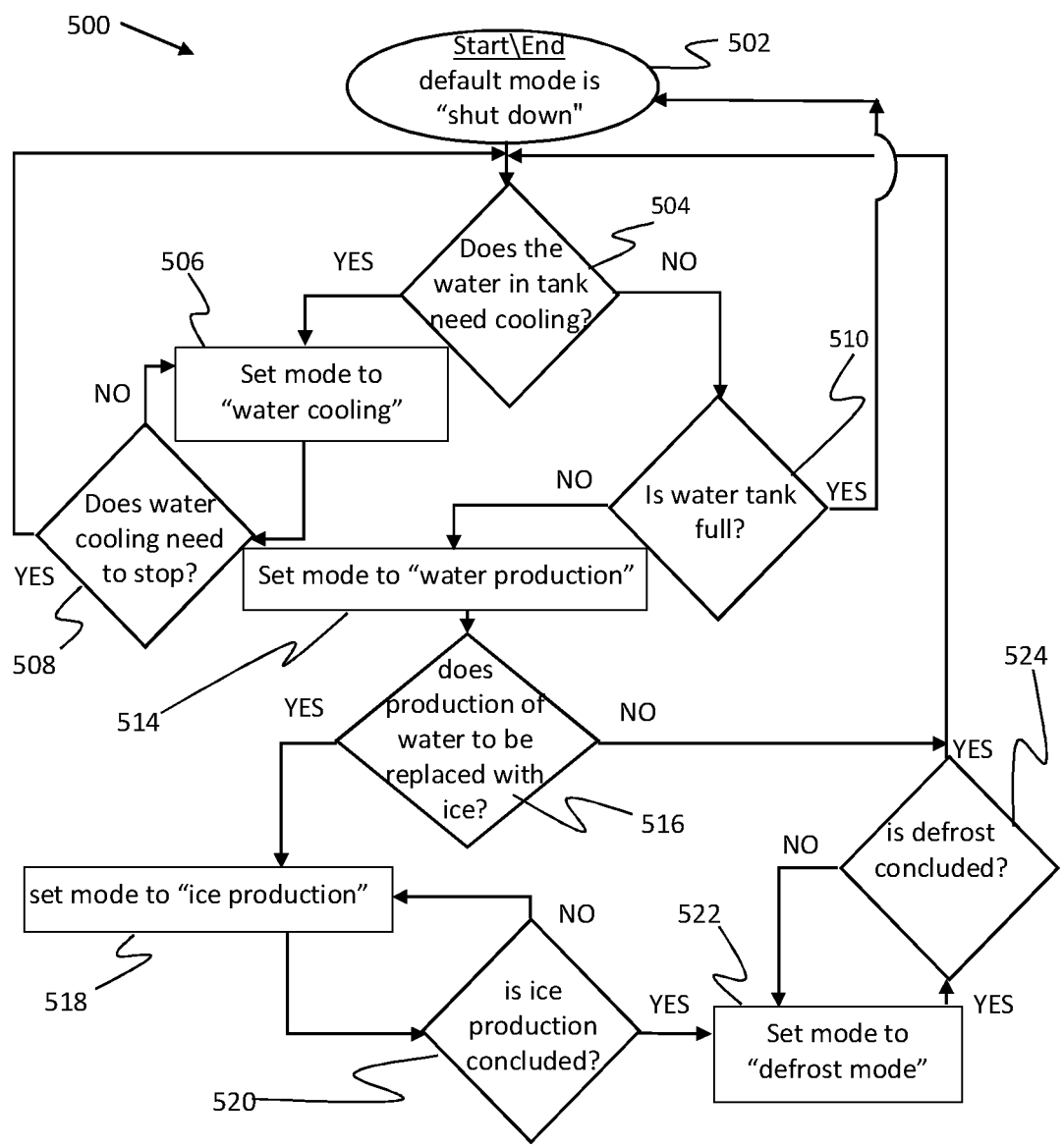
FIG. 5 is a flow chart depicting a method for operating the refrigeration system according to an embodiment of the invention.

Reference is now made to FIG. 5 depicting the logic in AWG apparatus comprising feature for cooling the stored water, such as apparatus 100, 200 or 300, containing or not containing addition 400 or 450 where appropriate. The logic is described in algorithm 500.

In initial step 502, the apparatus starts to operate. In this step, the mode is set to be SHUT DOWN mode, and the apparatus components act as described in the SHUT DOWN mode above.

Conditioning step 504, describes a check out to conclude whether or not the water tank should be cooled. The decision is made primarily by detecting the water temperature by a sensor but in order to decide whether to cool the water in the tank, it must contain sufficient water amount. The amount level can be measured by level sensor, differential pressure sensor, volumetric sensor or any other suitable sensor being in communication with the control unit. If water exists in the tank and its temperature as measured by a thermometer being in communication with the control unit is too high (i.e.—above a predetermined value that can be defined by the factory or by the user), the water in the tank needs to be cooled and the result of the condition is YES, otherwise, it's NO.

In step 506, the mode is set to be WATER-COOLING mode, and the apparatus components acts as described in the WATER-COOLING mode above.

Conditioning step 508, describes a check out to conclude whether or not the cooling of the water in the tank should stop. The decision is made primary according to an ad-hoc detected water temperature but it is also derived from its ad-hoc detected water level. If water temperature in the tank at or below a predefined temperature considered as "cold" (i.e. at or below a predetermined threshold determined by the factory) or the water level in the tank is too low (i.e. at or below a predetermined threshold determined by the factory), the water cooling should stop and the result of the condition is YES, otherwise, it is NO.

Conditioning step 510, describes a check out to conclude whether or not the water tank is full. The amount level can be measured by level sensor, differential pressure sensor, volumetric sensor or any other suitable sensor being in communication with the control unit. If water tank reaches the maximal amount (described here as full), the result of the condition is YES, otherwise, it is NO.

In step 514, the mode is set to be WATER-PRODUCTION mode, and the apparatus components acts as described in the WATER-PRODUCTION mode above.

Conditioning step 516, describes a check out to conclude whether or not the WATER-PRODUCTION mode should be replaced with ICE PRODUCTION mode. In order to do so, the controller measures the evaporator temperature by using temperature sensors in the vicinity of the evaporator. If the temperature is bellow first set point (for example, −2° C. or water freezing point) for a certain duration (for example, 1 minute) the result of the condition is YES, otherwise, it's NO.

In step 518, the mode is set to be ICE-PRODUCTION mode, and the apparatus components acts as described in the ICE-PRODUCTION mode above.

Conditioning step 520, describes a check out to conclude whether or not the ICE PRODUCTION mode should terminate. In order to do so, the controller estimates the amount of frost (ice) built upon the evaporator. For example, to integrate the difference between the environmental dew point and the evaporator temperature and multiply it by the airflow rate and by a coefficient. Another example is to measure the differential pressure of the airflow flowing over the evaporator. Other methods to estimate degree of ice build available in the art may also be implemented. If the estimated amount of ice is higher than a pre-defined level or if the ICE-PRODUCTION duration reaches certain level, the result of the condition is YES, otherwise, it's NO.

In step 522, the mode is set to be DEFROST mode, and the apparatus' components act as described in the DEFROST mode above.

Conditioning step 524, describes a check out determining whether or not the ice in the evaporator has defrosted. To determine that, the control may measure the evaporator temperature, may measure the differential pressure of the airflow over the evaporator, measure a drop in the rate of melted water added to the water sump or the rate of water dropping from the evaporator (for example by a microcamera), or utilize any other available technique which indicates the existence of ice. If the temperature or the differential pressure reaches a pre-determined value, the result of the condition is YES, otherwise, it's NO.

Figure 6:
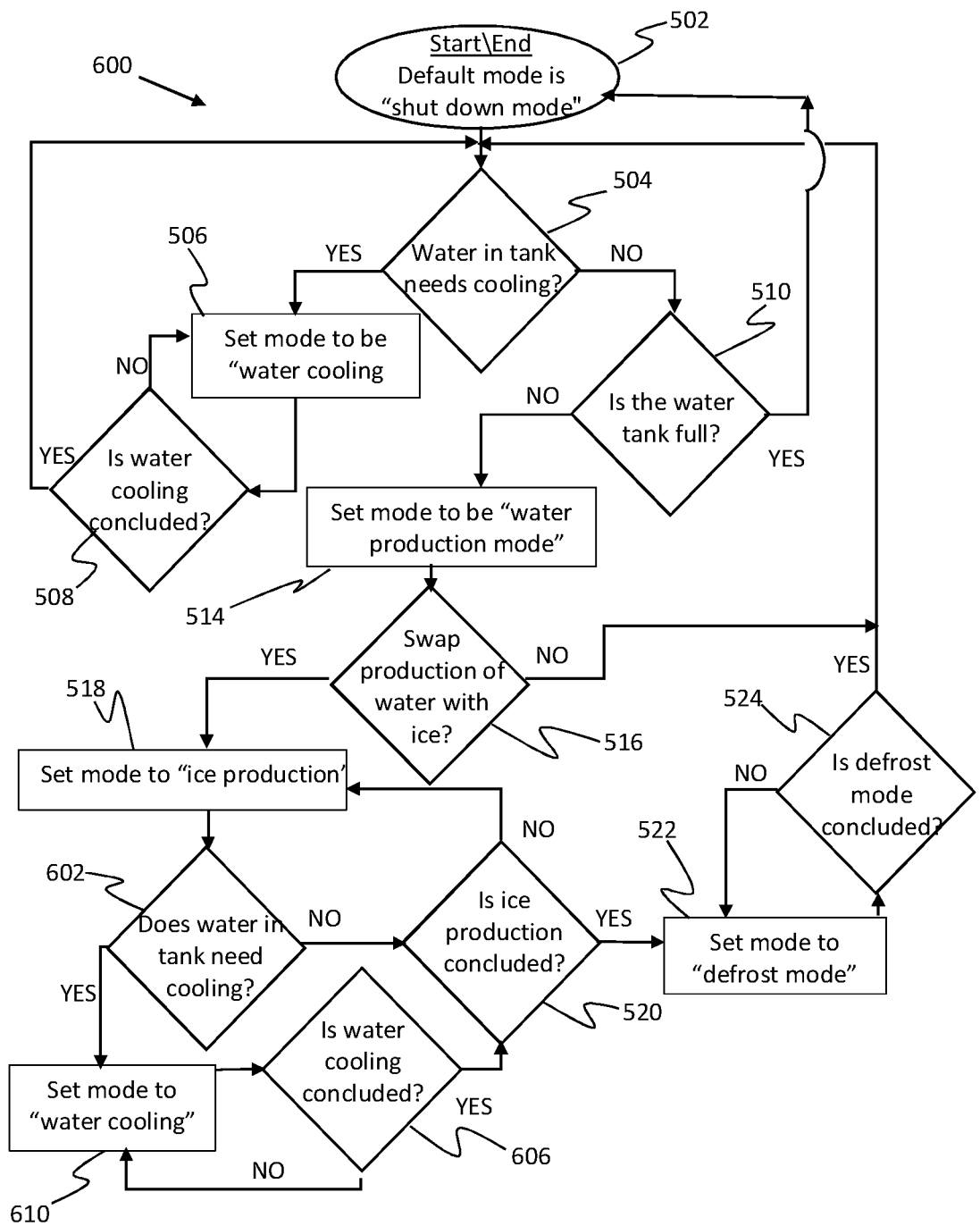
FIG. 6 is a flow chart depicting a method for operating the refrigeration system according to an embodiment of the invention.

Reference is now made to FIG. 6 depicting an operation logic 600 which includes some additions to the logic described in 500. Steps and conditioning steps that are numbered the same as described in FIG. 5, perform the same functionality. Unlike the logic 500, logic 600 enables the apparatus to cease the ICE PRODUCTION and to cool water even when ICE PRODUCTION does not conclude.

Conditioning step 602 performs as conditioning step 504. Conditioning step 606 performs as conditioning format 508, and step 610 performs as 506. Steps 504, 508, 506 are described above.

Algorithm 700

Figure 7:
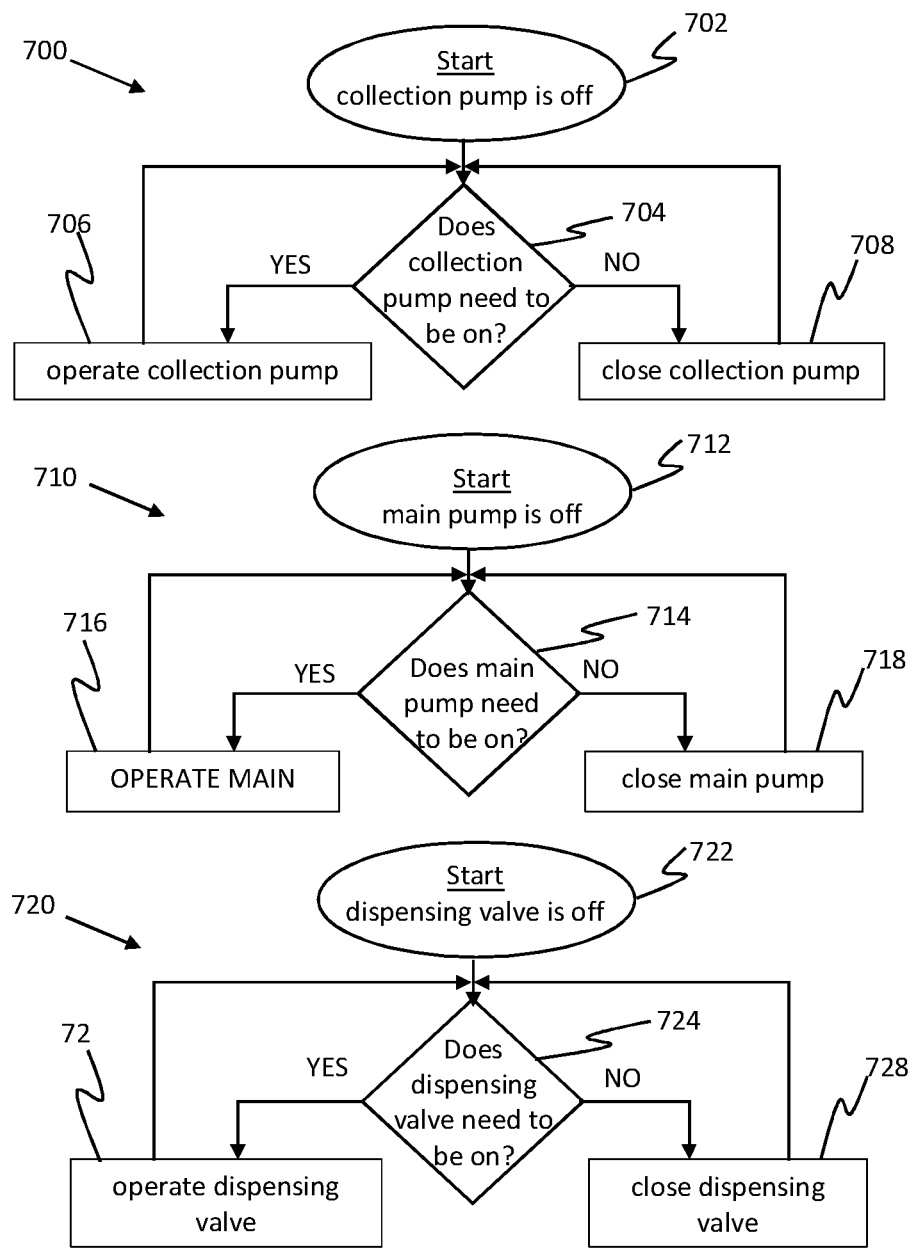
FIG. 7 is a flow chart depicting a method for operating the refrigeration system and the hydraulic system according to an embodiment of the invention.

FIG. 7 describes a logic of operation of the collection pump 46 in the apparatus.

In initial step 702, the logic starts. In this step, the collection pump 46 is off.

Conditioning step 704, describes a check out to conclude whether or not the collection pump 46 should be operated. If the collection pump 46 is not operating, its operation condition should be the water level in the sump 42. If the water level in the sump is above a predetermined level, then the decision is YES, otherwise the decision is NO. If the pump is operated, its stopping condition should be either time or low water level in the sump. The sump level(s) can be measures by level sensor, differential pressure sensor, volumetric sensor or any other suitable sensor. If the pump need to be operated, the decision is YES, otherwise, is NO.

In step 706, the collection pump is operated by the control.

In step 708 the collection pump is not operated.

Algorithm 710

FIG. 7 also describes the logic of operation of the main pump 52.1 in the apparatus.

In initial step 712, the logic starts. In this step, the main pump 52.1 is off.

Conditioning step 714, describes a check out to conclude whether or not the main pump 52.1 should be operated. The pump 52.1 should be operated in at least one of the following situations:

The user demands water to be dispensed (push button) and there is enough water in the water tank 62 (for example—right above the tank exit line or when reaching a predetermined level as sensed by a sensor).

According to a predetermined circulation period (for example—every half hour, circulate for 5 minutes)

During WATER-COOLING mode in apparatus 200 or even in 100 (to increase heat transfer coefficient)

If the pump 52.1 needs to be operated, the decision is YES, otherwise, is NO.

In step 716, the main pump 52.1 is operated by the control.

In step 718 the main pump 52.1 is not operated.

Algorithm 720

FIG. 7 also describes the logic of operation the dispensing valve 58 in the apparatus.

In initial step 722, the logic starts. In this step, the dispensing valve 58 is off.

Conditioning step 724, describes a check out to conclude whether or not the dispensing valve at the end of dispensing line 60 should be operated. The operation of the valve depends whether the user demands water to be dispensed (push button) and whether there is enough water in the water tank (for example—right above the tank exit line or when reaching a predetermined level as sensed by a sensor). If the valve needs to be operated, the decision is YES, otherwise, is NO.

In step 726, the dispensing valve 58 is operated by the control.

In step 728 the dispensing valve is not operated.

Algorithm 800

Figure 8:
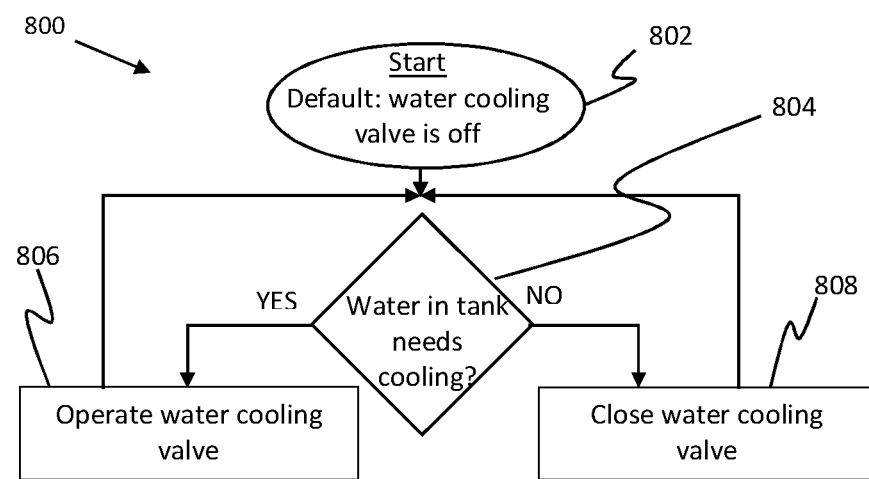
FIG. 8 is a flow chart depicting a method for operating an addition to the refrigeration and to the hydraulic system according to an embodiment of the invention.

FIG. 8 describes the logic of operation the water-cooling valve 18 in apparatuses 100, 200 and 94 in apparatus 300.

In initial step 802, the logic starts. In this step, the water cooling valve is off.

Conditioning step 804, describes a check out to conclude whether or not the water-cooling valve should be operated depending on whether the water in the water tank needs to be cooled. The conditioning step 804 has the same logic as conditioning step 504. The water-cooling valve should be operated during the WATER-COOLING mode. If the valve needs to be operated, the decision is YES, otherwise, is NO.

In step 806, the water-cooling valve is operated by the control.

In step 808 the water-cooling valve is not operated.

What is claimed is:

1. An atmospheric water generator (AWG) comprising:
   a refrigeration cycle for condensing water from the atmosphere into stored water;
   a storage tank defined by walls for storing the stored water;

a cooling compartment defined by walls, designed to comprise a cooling medium and comprising a refrigerant coil, and a circulation loop comprising:
   an outlet from the storage tank;
   an inlet to the storage tank;
   tubing for connecting the outlet to the inlet;
   a sprinkler connected to the inlet; and
   a circulation pump for circulating the water in the circulation loop, wherein:

the sprinkler located in the tank or in proximity thereto is adapted to sprinkle the water at least on the portion of a wall that is common to both the storage tank and to the compartment from the storage tank side, the storage tank and the cooling compartment sharing at least a portion of a common wall separating the storage tank from the cooling compartment having one surface of the wall facing the storage tank and the other surface of the wall facing the cooling compartment; and the refrigerant coil being in fluid communication with the refrigeration cycle and designed to be at least partially submerged in the cooling medium.

2. The AWG according to claim 1 wherein the common wall is adapted to transfer heat from the stored water in the storage tank through the common wall to the cooling medium in the opposite face of the common wall and from the cooling medium to the refrigerant coil.

3. The AWG according to claim 1 wherein the refrigeration cycle comprises a valve having at least two states: In a first state, the valve directs the refrigeration cycle to an evaporator for condensation of water from the atmosphere; in a second state the valve directs the refrigeration cycle to the refrigerant coil for chilling the cooling medium.

4. The AWG according to claim 1 wherein the storage tank is made of a thermoplastic material.

5. The AWG according to claim 1 wherein at least one of the storage tank and the cooling compartment comprises at least a second portion of a wall, other than the portion of a wall that is common to both the storage tank and to the compartment, wherein the second at least portion of the wall is covered by insulation layer.

6. The AWG according to claim 1 wherein the storage tank further comprises a cap adapted to reduce leakages of stored water from the storage tank.

7. The AWG according to claim 1 wherein the cooling compartment further comprises a cap adapted to reduce leakages of cooling medium from the cooling compartment.

8. The AWG according to claim 7 wherein one cap is adapted to reduce leakages of cooling medium from the cooling compartment and stored water from the storage tank.

9. The AWG according to claim 1 wherein the water circulation loop comprises at least one of a filter, and a UV radiation lamp.

10. The AWG according to claim 1 wherein the cooling medium is a liquid or a gel having a melting point temperature below 0° C.

11. The AWG according to claim 1 further comprising a controller for controlling operation of the fluid communication between the refrigerant coil in the cooling compartment and the refrigeration cycle for condensing water.

* * * * *